E. A. MERCER.
Nut-Lock.
No. 225,713.  Patented Mar. 23, 1880.
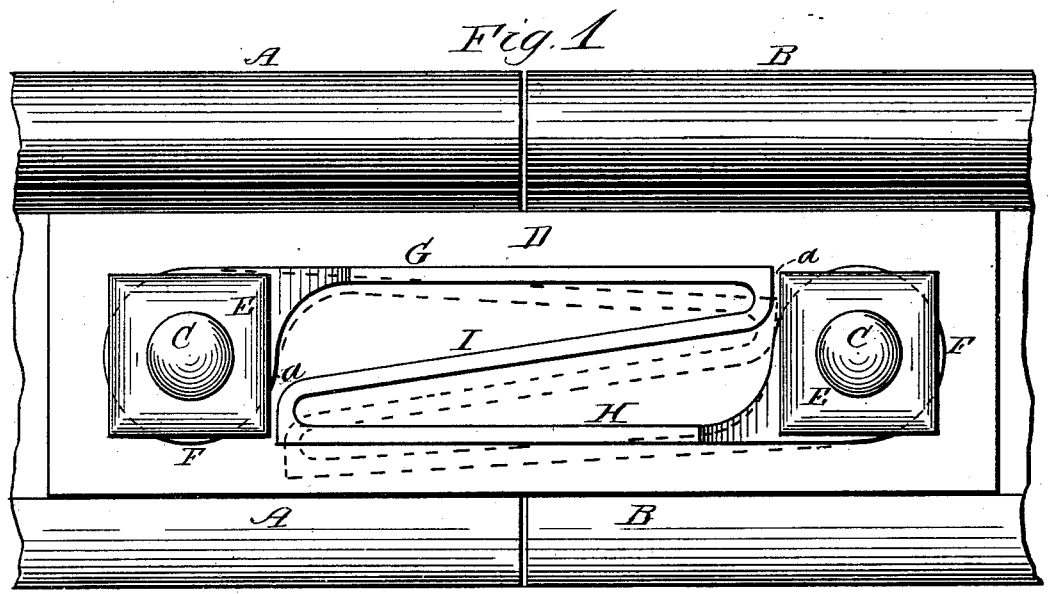
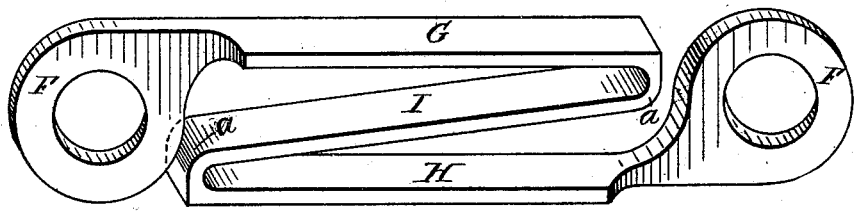
Witnesses
Nat. E. Oliphant
Geo. R. Porter
Inventor
Evan A. Mercer
per Chas. H. Fowler
Attorney

UNITED STATES PATENT OFFICE.

EVAN A. MERCER, OF CHRISTIANA, PENNSYLVANIA, ASSIGNOR OF ONE-HALF OF HIS RIGHT TO TAYLOR B. MERCER, OF SAME PLACE.

NUT-LOCK.

SPECIFICATION forming part of Letters Patent No. 225,713, dated March 23, 1880.

Application filed January 2, 1880.

*To all whom it may concern:*

Be it known that I, EVAN A. MERCER, of Christiana, in the county of Lancaster and State of Pennsylvania, have invented a new and valuable Improvement in Nut-Locks; and I do hereby declare that the following is a full, clear, and exact description of the construction and operation of the same, reference being had to the annexed drawings, making a part of this specification, and to the letters and figures of reference marked thereon.

Figure 1 of the drawings is a side elevation of my nut-lock, showing its application to lock the nuts upon the bolts of railroad-rails. Fig. 2 is a detached perspective view of the nut-lock.

The present invention has relation to that class of nut-locks composed of a single piece of plate metal, or a continuous metal rod, stamped or bent to form eyes for encircling the ends of the screw-bolts, and arms to bear endwise against the side faces of the nuts to securely lock them in place.

The object of the invention is to provide a simple and effective device that will securely hold the nuts upon the bolts and prevent them from being disconnected, and at the same time to allow the nuts to be easily removed and replaced when required.

The invention consists of a Z-shaped metal plate, the free ends thereof having eyes or washers for encircling the ends of the bolts, as will be hereinafter more fully described.

In the accompanying drawings, A B represent two sections of a rail, through which and the fish-plate D pass the screw-bolts C, the plate being held in place against the side of the rail by nuts E engaging with the screw-threaded ends of the bolts, all of which is common, and simply shown to illustrate the application of my improved nut-lock.

The nut-lock is of Z shape, and is composed of malleable iron, steel, or any other suitable metal, and is formed at its outer ends with eyes or washers F, to pass over and encircle the screw-threaded ends of the bolts C. Branching in opposite directions from the eyes or washers are horizontal arms G H, of greater thickness than the washers, so that the ends of the arms will project out laterally beyond the faces of said washers and abut against the sides of the nuts.

The ends of the arms G H are connected by a diagonal brace, I, which gives strength to the device, and holds the arms in their relative position with each other and against the faces or sides of the nuts. The points of juncture between the arms G H and diagonal brace I are rounded off, as shown at *a*, in order to allow the nuts to turn freely on the screw-threaded ends of the bolts and be automatically locked.

When it is desired to lock the nuts, after the bolts have been inserted through the sections of rail and fish-plate, the eyes or washers F are passed over the ends of the bolts, and the nuts screwed on. As the nuts are turned down against the faces of the washers each corner of the nuts, as it comes in contact with the rounded or beveled end *a*, displaces it sufficiently to allow it to pass, and so on, until the under sides of the nuts come tightly against the faces of the washers.

It will be noticed that the nuts are automatically locked at every quarter-turn until they are entirely screwed up to the washers, thus forming a complete and effectual nut-lock.

In removing the nuts the arm H is pressed downward, as shown in dotted lines, and the arm G upward, so that the corners of the nuts while being unscrewed will not come in contact with the ends of the arms and diagonal brace, thereby admitting of the nuts being readily disconnected from the screw-bolts.

In a nut-lock constructed in accordance with my invention the labor of bending the arms outward and in position to abut against the side of the nuts after they have been screwed down in place is entirely obviated, and the nuts can be retightened to compensate for wear with comparatively little trouble.

Having now fully described my invention, what I claim as new, and desire to secure by Letters Patent, is—

The improved nut-lock substantially as herein described—namely, the Z-shaped plate G H I, and the washers F, integral therewith at the two ends, for the purpose set forth.

In testimony that I claim the above I have hereunto subscribed my name in the presence of two witnesses.

EVAN A. MERCER.

Witnesses:
WILLIAM HOLLIS,
KATE C. MERCER.